US012583179B2

(12) United States Patent
Giloh

(10) Patent No.: US 12,583,179 B2
(45) Date of Patent: Mar. 24, 2026

(54) ADJUSTABLE SHAPE CHANGING PRINTING BED FOR ADDITIVE MANUFACTURING

(71) Applicant: Ehud Giloh, Manchester (GB)

(72) Inventor: Ehud Giloh, Manchester (GB)

(73) Assignee: Ehud Giloh, Manchester (GB)

( * ) Notice: Subject to any disclaimer, the term of this patent is extended or adjusted under 35 U.S.C. 154(b) by 112 days.

(21) Appl. No.: 18/721,666

(22) PCT Filed: Dec. 21, 2022

(86) PCT No.: PCT/IL2022/051370
§ 371 (c)(1),
(2) Date: Jun. 19, 2024

(87) PCT Pub. No.: WO2023/119288
PCT Pub. Date: Jun. 29, 2023

(65) Prior Publication Data
US 2025/0058517 A1 Feb. 20, 2025

Related U.S. Application Data

(60) Provisional application No. 63/291,960, filed on Dec. 21, 2021.

(51) Int. Cl.
| | |
|---|---|
| *B29C 64/00* | (2017.01) |
| *B29C 64/232* | (2017.01) |
| *B29C 64/245* | (2017.01) |
| *B33Y 30/00* | (2015.01) |

(52) U.S. Cl.
CPC .......... *B29C 64/245* (2017.08); *B29C 64/232* (2017.08); *B33Y 30/00* (2014.12)

(58) Field of Classification Search
CPC ............................ B29C 64/245; B29C 64/232
See application file for complete search history.

(56) References Cited

U.S. PATENT DOCUMENTS

| | | | |
|---|---|---|---|
| 2015/0192919 A1 | 7/2015 | Sketch et al. | |
| 2016/0068793 A1* | 3/2016 | Maggiore | C12M 41/12 |
| | | | 901/22 |
| 2016/0288427 A1 | 10/2016 | Foley et al. | |
| 2018/0339455 A1* | 11/2018 | Cohen | B29C 64/25 |
| 2019/0366635 A1* | 12/2019 | Holt | B29C 64/264 |
| 2020/0139619 A1* | 5/2020 | Prucha | B33Y 50/02 |
| 2020/0139630 A1* | 5/2020 | Prucha | B01D 63/081 |
| 2020/0238382 A1* | 7/2020 | Shi | B22F 10/28 |
| 2021/0046704 A1 | 2/2021 | Huttunen et al. | |

(Continued)

*Primary Examiner* — Nicholas Krasnow

(74) *Attorney, Agent, or Firm* — SOROKER AGMON NORDMAN RIBA

(57) ABSTRACT

Provided is a shape-changing printing bed system and method for use during additive manufacturing, the system comprising: a shape-changing printing bed comprising: an elastic sheet having an inner side and an external side, and a manipulator unit. The elastic sheet has a given size and shape, and the external side of the elastic sheet is configured to cover the manipulator unit. The system further comprises a control system, whereby the control system is configured to control change in size and/or shape of the elastic sheet by controlling change in direction and extent of force applied by the manipulator unit against the inner side of the elastic sheet in at least one coordinate.

16 Claims, 7 Drawing Sheets

(56) References Cited

U.S. PATENT DOCUMENTS

| | | | |
|---|---|---|---|
| 2021/0069964 A1* | 3/2021 | Boyer ................... | B29C 64/264 |
| 2022/0218496 A1* | 7/2022 | Hopson .................... | A61F 2/44 |
| 2023/0182390 A1* | 6/2023 | Megretski .............. | B29C 64/30 |
| | | | 264/308 |
| 2023/0226746 A1* | 7/2023 | Vatani .................. | B29C 64/264 |
| | | | 264/308 |
| 2023/0356458 A1* | 11/2023 | Prucha ................. | B29C 64/223 |

* cited by examiner

Elastic sheet 102

Adhesive 112

Swivel ball 144

Actuator end 134

154

124

Upper surface 102 of adjustable shape-changing print bed

100

124

114

Actuator 104

102

102

102

Fixed Core 106

Vacuum cup 110

Vacuum hose 116

Z-Axis

108

Position A

Elastic sheet
102

Actuators
104

Fixed core
106

114  124

Position B

102

Axis z 124  114  106  104

Axis x &/or y

Position C

102

Axis z 124  114  104  106

Top View

Isometric View

Front View

Elastic sheet 102

Axis z 124   114   Axis x &/or y   106   104

Side View

Actuators
104

Fixed core
106

124

114

Bottom View

SECTION B-B

200

204

204

202

202

206

202

Elastic sheet
202

Elastic sheet
202

Base
206

Elastic sheet
202

Base
206

106

ADJUSTABLE SHAPE CHANGING PRINTING BED FOR ADDITIVE MANUFACTURING

TECHNICAL FIELD

The present disclosure generally relates to a printing bed for additive manufacturing, and more specifically to a printing bed that is capable of changing its shape.

BACKGROUND

Both material and time may be wasted during additive manufacturing (AM), especially in AM processes applying material by spraying onto a printing bed, since the printing bed, onto which printing is performed, currently comprises a flat shape only. And in case final products do not have a flat shape or flat base, when the printed item is curved or does not include a flat surface that is large enough to serve as a base for a printed part of the entire printed item, fillers might be required to create those various non-flat shapes. That is, fillers must be printed or otherwise applied onto the printing bed, before or during printing of the printed product, to fill area(s) which are not part of the actual manufactured product.

Alternatively, multiple sets of printing beds must be used to fit different variables of the product. Moreover, replacing the printing beds between and for each product is very time consuming, which can greatly impact the cost of production and might seriously limit full realization of the potential of the AM technology.

There is thus a need for a system and method that enable a simple and less time-consuming additive manufacturing process of non-flat items or products.

SUMMARY

The present disclosure provides an adjustable, shape-changing printing bed, which comprises an elastic sheet, and which enables continuous adjustments of the shape of the elastic sheet to substantially any required shape along the surface of the elastic sheet or the printing bed body created by the elastic sheet. For example, the adjustable printing bed may be used to create steps, slops, curves, convex and concave or any other desired shape along the surface of the elastic sheet. The shape change may be dictated per user-command and/or automatically based on a pre-determined computerized plan (i.e., computerized files) of the item/ product that should be printed by the additive manufacturing printer onto the adjustable printing bed.

There is provided a shape-changing printing bed system for use during additive manufacturing, the system comprising: a shape-changing printing bed comprising: an elastic sheet comprising an inner side and an external side; and a manipulator unit; wherein the elastic sheet has a given size and shape, and the external side of the elastic sheet is configured to cover the manipulator unit; and a control system. In some embodiments, the control system may be configured to control change in the size and/or shape of the elastic sheet by controlling change in direction and extent of force applied by the manipulator unit against the inner side of the elastic sheet in at least one coordinate.

In some embodiments, the control system may be configured to control the manipulator unit to apply force against the inner side of the elastic sheet, in a pre-determined controlled manner, based on external input.

In some embodiments, the manipulator unit may comprise: a fixed core; and multiple actuators having two opposing fixation ends, each of the multiple actuators being connected to the fixed core via a first fixation end, and each of the multiple actuators being connected to the inner side of the elastic sheet via a second fixation end.

In some embodiments, movement of the multiple actuators at their second fixation ends along one or more of X, Y and Z axes may cause pushing and/or pulling force to be applied against the inner side of the elastic sheet, thereby causing the inner side of the elastic sheet to be moved along one or more of the X, Y, and Z axes, which may change shape of the elastic sheet.

In some embodiments, the manipulator unit may comprise at least one inflatable or partly inflatable article having a back surface and a front surface, wherein the front surface is facing the inner side of the elastic sheet, and wherein inflation or deflation of the at least one inflatable or partly inflatable article causes the front surface to change position in one or more of X,Y,Z axes, thereby applying force against the inner side of the elastic sheet in one or more of X, Y and Z axes.

In some embodiments, the elastic sheet may be connected to or is the front surface of the inflatable or partly inflatable article.

In some embodiments, the manipulator unit comprises a combination of neighboring actuators and inflatable or partly inflatable articles, wherein the inflatable or partly inflatable articles apply a first force on a corresponding zone of the inner side of the elastic sheet, while the actuators independently apply a second force against the same zone, to change shape of smaller more specified areas in said zone of the inner side of the elastic sheet.

In some embodiments, the control system may be configured to control length of each actuator and further control inflation or deflation of the inflatable or partly inflatable articles such to change the shape of the elastic sheet within a short time from the time a control command is provided by the control system.

In some embodiments, the control system may be operated in real-time by user command and/or is operated automatically according to a predetermined production plan provided to the control system via a computerized production file.

In some embodiments, each actuator comprises an actuator body and a retractable actuator arm passing therethrough, wherein the control system is configured to control length of each retractable actuator arm with respect to the actuator body, wherein extending the length of the retractable actuator arm outside the actuator body pushes the inner side of the elastic sheet outwards to create a protrusion along the external side of the elastic sheet, and shortening the length of the retractable actuator arm pulls the inner side of the elastic sheet inwards to create an indent, thereby changing shape of the elastic sheet within a short time from a control command provided by the control system.

In some embodiments, the control system may be operated in real-time by user command and/or is operated automatically according to a predetermined production plan provided to the control system via a computerized production file.

In some embodiments, the control system may be configured to control inflation or deflation of the inflatable or partly inflatable articles such to change the shape of the elastic sheet within a short time from a control command provided by the control system.

In some embodiments, the control system is operated in real-time by user command and/or is operated automatically according to a predetermined production plan provided to the control system via a computerized production file.

There is provided a method for changing shape of a shape-changing printing bed system, said method comprising:

providing a shape-changing printing bed system, comprising:

a shape-changing printing bed comprising:

an elastic sheet comprising an inner side and an external side; and a manipulator unit;

wherein the elastic sheet has a given size and shape, and the external side of the elastic sheet is configured to cover the manipulator unit;

and a control system;

and controlling change in direction and extent of force applied by the manipulator unit against the inner side of the elastic sheet in at least one coordinate by the control system, thereby changing shape of the shape-changing printing bed.

In some embodiments, the manipulator unit comprises: a fixed core; and multiple actuators having two opposing fixation ends, each of the multiple actuators being connected to the fixed core via a first fixation end, and each of the multiple actuators being connected to the inner side of the elastic sheet via a second fixation end.

In some embodiments, controlling comprises controlling movement of the multiple actuators at their second fixation ends along one or more of X, Y and Z axes, which causes pushing or pulling force to be applied against the inner side of the elastic sheet, thereby moving the inner side of the elastic sheet along one or more of the X, Y, and Z axes, which results in changing shape of the elastic sheet.

In some embodiments, the manipulator unit comprises a combination of neighboring actuators and inflatable or partly inflatable articles, wherein controlling comprises controlling application of a first force by the inflatable or partly inflatable articles on a corresponding zone of the inner side of the elastic sheet, while controlling application of a second force by the actuators against the same zone, independently of the application of the first force, thereby changing shape of smaller more specified areas in the zone of the inner side of the elastic sheet by said application of the second force.

In some embodiments, the controlling comprises controlling length of each actuator and further controlling inflation or deflation of the inflatable or partly inflatable articles such to change the shape of the elastic sheet within a short time from the time a control command is provided by the control system.

In some embodiments, the controlling is performed in real-time by user command and/or is performed automatically according to a predetermined production plan provided to the control system via a computerized production file.

In some embodiments, each actuator comprises an actuator body and a retractable actuator arm passing therethrough, wherein the controlling comprises controlling length of each retractable actuator arm with respect to the actuator body, wherein extending the length of the retractable actuator arm outside the actuator body pushes the inner side of the elastic sheet outwards to create a protrusion along the external side of the elastic sheet, and shortening the length of the retractable actuator arm pulls the inner side of the elastic sheet inwards to create an indent, thereby changing shape of the elastic sheet within a short time from a control command provided by the control system.

BRIEF DESCRIPTION OF THE DRAWINGS

Some non-limiting exemplary embodiments or features of the disclosed subject matter are illustrated in the following drawings.

In the drawings.

Figures 1, 1A, 1B:
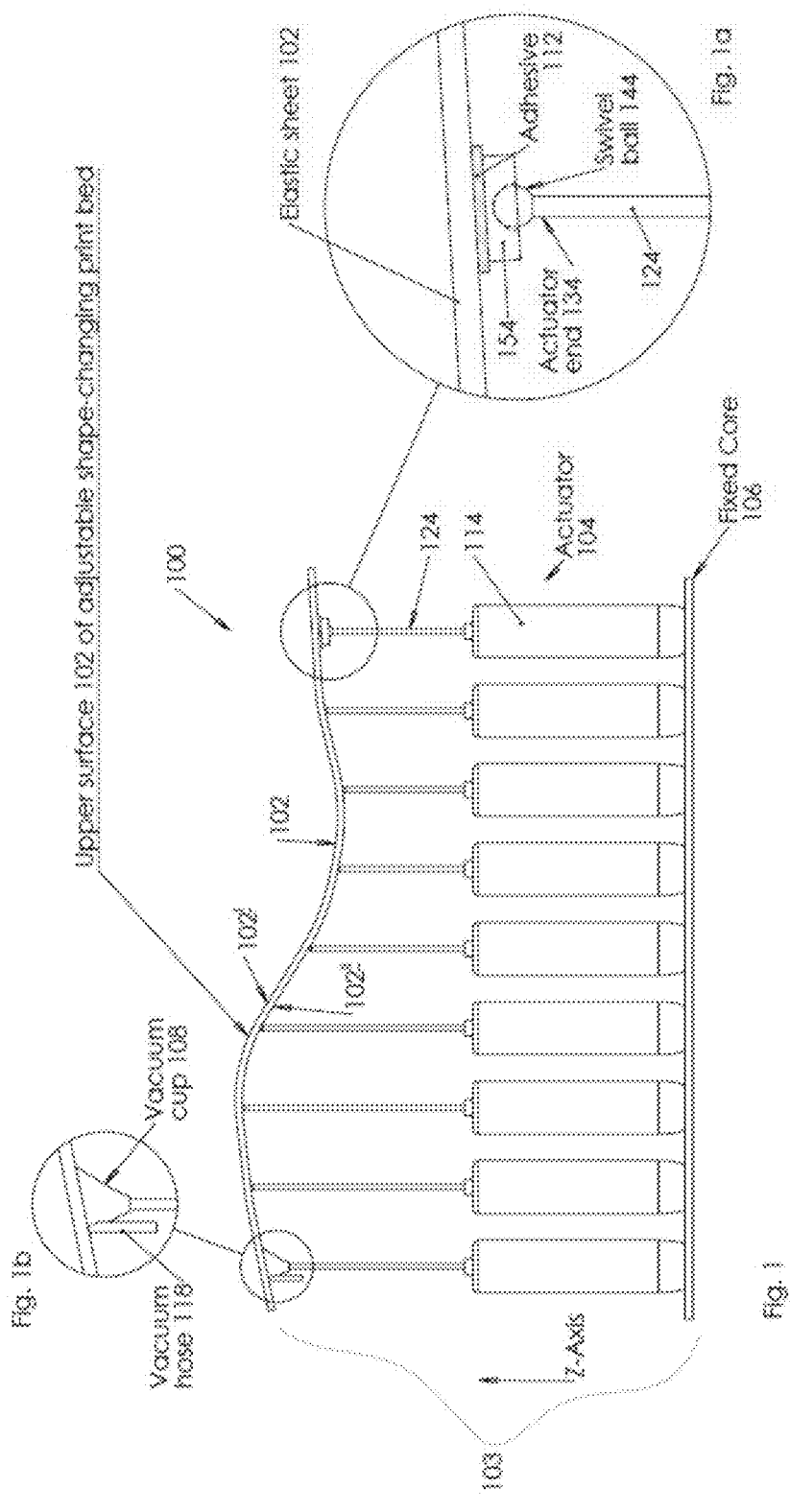
FIG. 1 is a schematic illustration of a cross-section of the shape-changing printing bed comprising actuators, according to some embodiments of the present disclosure.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspectives or from different point of views.

DETAILED DESCRIPTION

The present disclosure provides a printing bed configured to enable additive manufacturing, whereby the printing bed may be able to change its shape per required shape of the final product. The shape-changing printing bed may comprise moveable actuators and/or inflatable bodies that are used to change the shape of an elastic sheet that covers the actuators and/or inflatable bodies, to provide a smooth look to the entire shaped printing bed.

The present disclosure further provides a system comprising the shape-changing printing bed and a control unit that is configured to control operation of the shape-changing printing bed, such to control the shape of the printing bed per user requirements, according to a required shape of a final product that is manufactured by additive manufacturing onto the printing bed.

Reference is now made to FIG. 1, which is a schematic illustration of a cross-section of the shape-changing printing bed comprising actuators, according to some embodiments of the present disclosure. In some embodiments, shape-changing printing bed 100 may comprise an elastic sheet 102, which may be made of an elastic or stretchable material, onto which the additive manufacturing (AM) materials may be applied to create the AM final product. The elastic sheet 102 may comprise multiple zones. In some embodiments, the elastic sheet 102 may be stretchy and may change its shape according to the movement of multiple actuators connected to it, as will be explained in detail hereinbelow. Elastic sheet 102 may be made from any suitable elastic or stretchable material, such as rubber, natural rubber latex, neoprene, silicon rubber, and lycra rich fabrics, though other materials may be used.

In some embodiments the elastic sheet 102 may be made of anti-stick, or hydrophobic, or semi-hydrophobic material, to ease release of the material applied onto the upper surface 102' of elastic sheet 102, i.e., to ease release of the printed product from the printing bed 100. Alternatively, the uppermost surface 102' of the elastic sheet 102 may comprise anti-stick, hydrophobic or semi hydrophobic materials, such as silicon, or may be anti-stick coated, by any suitable material known in the art, to ease release of the product/item that is manufactured on the elastic sheet 102 from the elastic sheet 102.

In some embodiments, shape-changing printing bed 100 may comprise a manipulator unit 103, which may comprise mechanical actuators and/or may comprise inflatable or partly inflatable articles that may be connected to the inner side 102" of elastic sheet 102, may be covered by elastic sheet 102, and may be configured to manipulate, adjust and change the shape of elastic sheet 102, according to user real-time request and/or per a predetermined requirement provided by a production plan via a computerized production file.

In some embodiments, manipulator unit 103 may comprise actuators 104, which may comprise an actuator body 114 and a retractable actuator arm 124. Retractable arm 124 may be configured to be retracted into actuator body 114 or out of actuator body 114 to thereby change length of retractable arm 124 and thus change the total length of actuator 104, per need, in order to affect change of shape of the elastic sheet 102, as will be explained hereinbelow.

In some embodiments, each of actuators 104 may comprise two opposing ends which may act as two opposing fixation ends. Each of actuators 104 may be connected via the first fixation end to a fixed core 106, and via an opposing second fixation end to the inner side 102" of elastic sheet 102. In some embodiments, the second fixation end of actuator 104 may be associated with a corresponding zone of elastic sheet 102. In some embodiments, the actuators 104 may be electric, hydraulic or pneumatic pistons. For example, in case actuators 104 are electric pistons, they may be similar to the ones manufactured by: Xeryon, Festo and Actuonix.

In some embodiments, as illustrated in FIG. 1A, the second fixation end of actuators 104 may comprise a swivel ball 144 mounted on top of the retractable actuator arm 124, at actuator end 134. The swivel ball 144 may be configured to turn and rotate within a corresponding swivel ball housing 154, which in turn may be connected to elastic sheet 102 via adhesive 112, which may be applied along the inner side 102" of elastic sheet 102. Adhesive 112 may be applied, for example, between the inner side 102" of elastic sheet 102 and swivel ball housing 154 such to enable connection of the swivel ball housing 154 to elastic sheet 102. The rotation of swivel ball 144 within its corresponding housing 154 enables change in position of actuators 104 in space, thereby changing shape of the elastic sheet 102, specifically its external side 102'.

In other embodiments, any other suitable connector that is attached to the elastic sheet 102 or is integrally built in the elastic sheet 102, may be implemented.

In yet other embodiments, at least some of each of the ends 134 of actuator 104 may not be affixed to the elastic sheet 102. In such case, some actuators 104 may simply push the elastic sheet 102 to form the desired shape, or the actuators 104 may comprise vacuum nipples or/and vacuum cups 108 to grip the elastic sheet 102 and place the zone of elastic sheet 102 corresponding to vacuum cup 108 at a desired location. Such a vacuum system, which may comprise vacuum cups 108 may be controlled and operated via a vacuum pump, a vacuum hose or vacuum valve 118, as known in the art. In some embodiments, as illustrated in FIG. 1B, the second fixation end 134 of actuators 104 may comprise a vacuum cup 108 and a vacuum hose 118 instead of the swivel ball 144 and adhesive 112 applied onto the inner side 102" of elastic sheet 102, and through which actuators 104 are connected to elastic sheet 102.

In some embodiments, the actuators 104 may be affixed to the elastic sheet 102, such that movements of the end of each actuator 104, the end being connected to the inner side 102" of elastic sheet 102, may directly and immediately change the height or the position of the zone of elastic sheet 102 to which the actuator 104 is connected to, along one or more of the X, Y or Z axes.

As illustrated in FIG. 1, the retractable actuator arm 124 may change its length and thus position of elastic sheet 102 along Z axis.

Figure 2:
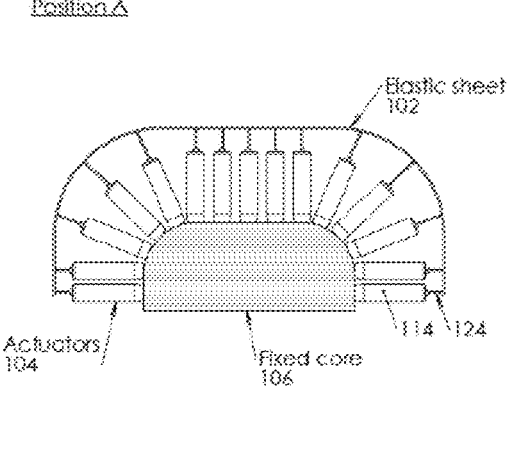
FIG. 2 is a schematic illustration of a cross-section of the shape-changing elastic printing bed in different positions, according to embodiments of the present disclosure.
Figure 2:
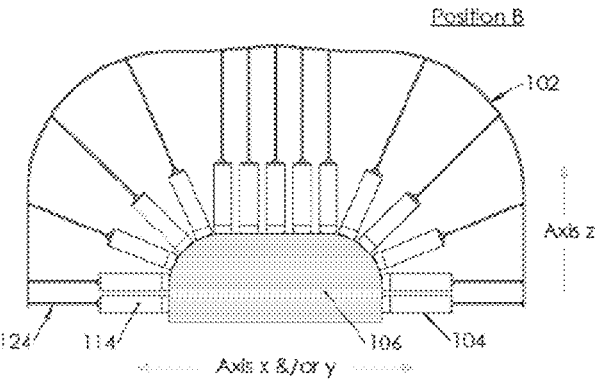
Figure 2:
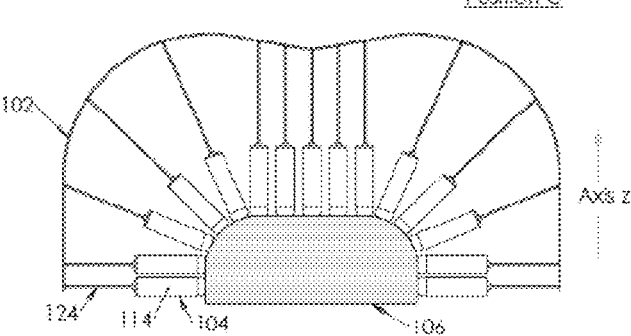

Reference is now made to FIG. 2, which is a schematic illustration of a cross-section of the shape-changing elastic printing bed in different positions, according to embodiments of the present disclosure. The different positions A-C illustrate examples of height and/or width adjustments that may be enabled by the adjustable shape-changing printing bed 100 of the present disclosure, by changing the length of different retractable actuator arms 124 of actuators 104. That is, shape of elastic sheet 102 is changed by adjusting the length of the retractable actuator arms 124 along one or more of the X, Y or Z axes.

As illustrated in position A, actuators 104 are connected to a fixed core 106 at a first position, i.e., the retractable actuator arms 124 of actuators 104 are of a certain length. Fixed core 106 is not moveable, and forms the base of shape-changing printing bed 100. Actuators 104 change their lengths and thus change position and shape of elastic sheet 102, specifically the shape of the external side 102' of elastic sheet 102.

As illustrated in the example of position B, retractable actuator arms 124 may be retracted out or pushed out of their respective actuator bodies such to lengthen the size of retractable actuator arms 124, thereby changing shape of elastic sheet 102, such to create a similar shape as in position A but expanded, e.g., by having a larger diameter. That is, in position B, elastic sheet 102 changes in both Z axis as well as X and/or Y axes, depending on the specific actuator's position in space, with respect to fixed core 106.

In some embodiments, as illustrated in the example of position C, the retractable actuator arms 124 of centrally positioned actuators 104 may be pulled into actuator bodies 114 to some extent, i.e., along Z axis, thereby creating a new shape for elastic sheet 102, which resembles a rounded 'M' shape.

Similarly, each actuator 104 may operate either independently or as part of a group of actuators to change the shape of elastic sheet 102, and thus change the shape of the final product that is printed onto elastic sheet 102 via additive manufacturing process, by creating convex and concave areas, side by side, at different zones of the elastic sheet 102.

Figure 3:
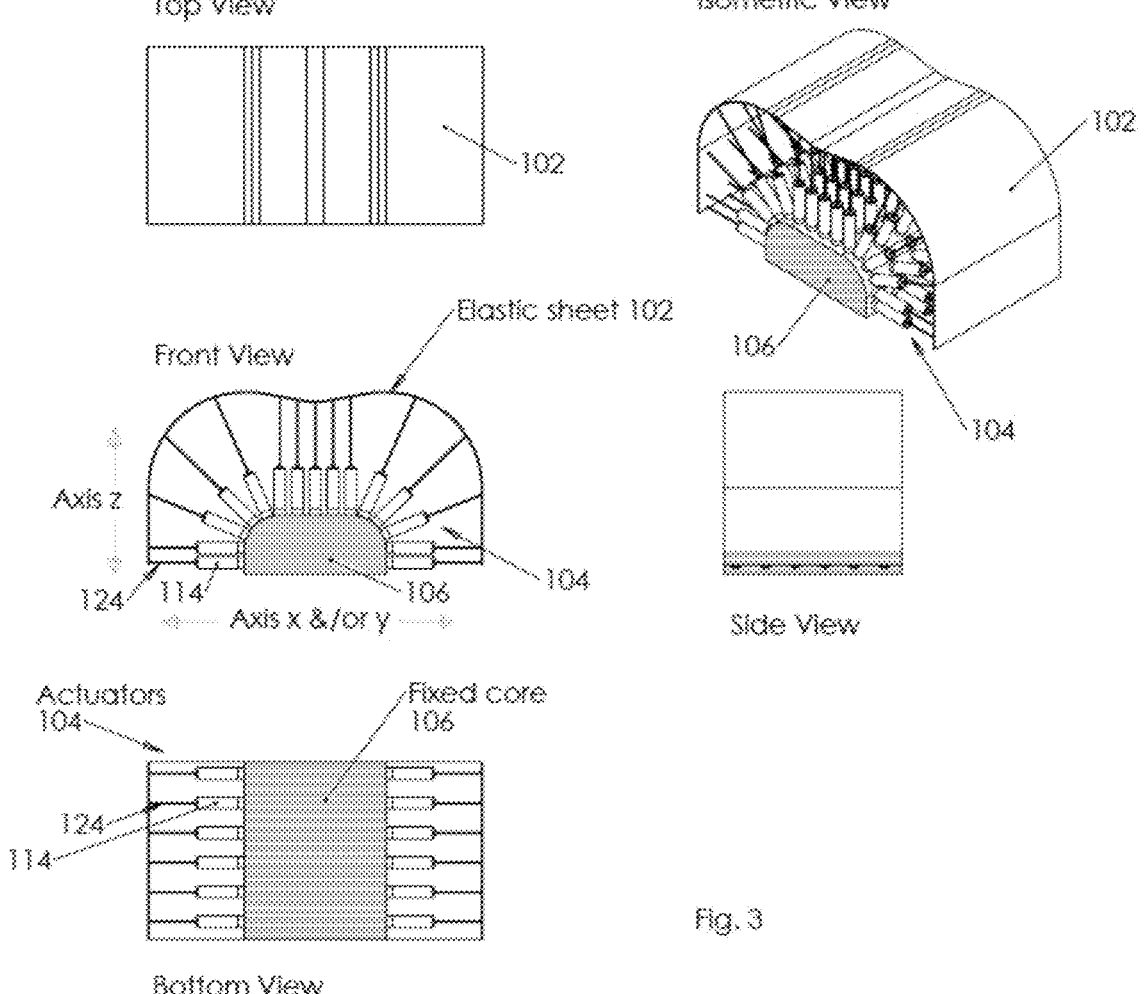
FIG. 3 is a schematic illustration of the shape-changing printing bed from different views- top, isometric, front, side and bottom, according to embodiments of the present disclosure.

Reference is now made to FIG. 3, which is a schematic illustration of the shape-changing printing bed from different views, i.e., top, isometric, front, side and bottom, according to embodiments of the present disclosure. As illustrated in FIG. 3, the actuators 104 are connected to the inner side 102″ of elastic sheet 102, such that movement of the actuators applies force onto elastic sheet 102 and causes elastic sheet 102 to change its shape accordingly. The amount of pull or push of manipulator unit 103, e.g., of retractable actuator arm 124, out and into actuator body 114, dictates the extent of force applied by the manipulator unit 103, against the inner side 102″ of the elastic sheet 102 in at least one coordinate of axes X, Y and Z. As illustrated in the isometric view, the external side 102' of elastic sheet 102, changes its shape once the respective actuators 104 change their lengths with respect to one another. Accordingly, the shape of the final product that is printed onto the external side 102' of elastic sheet 102, is affected by the shape of elastic sheet 102.

As can also be seen from the bottom view, the shape-changing printing bed 100 may comprise a cylindrically or circular shaped fixed core 106, with a flat opposite end. The fixed core may have attached thereon multiple actuators 104, which may be arranged along the entire circumference of fixed core 106, similarly to how the thorns of a hedgehog are arranged onto the hedgehog's back. It should be clear that other arrangements of actuators 104 along different shaped fixed cores 106 may be implemented as part of shape-changing printing bed 100.

Figure 4:
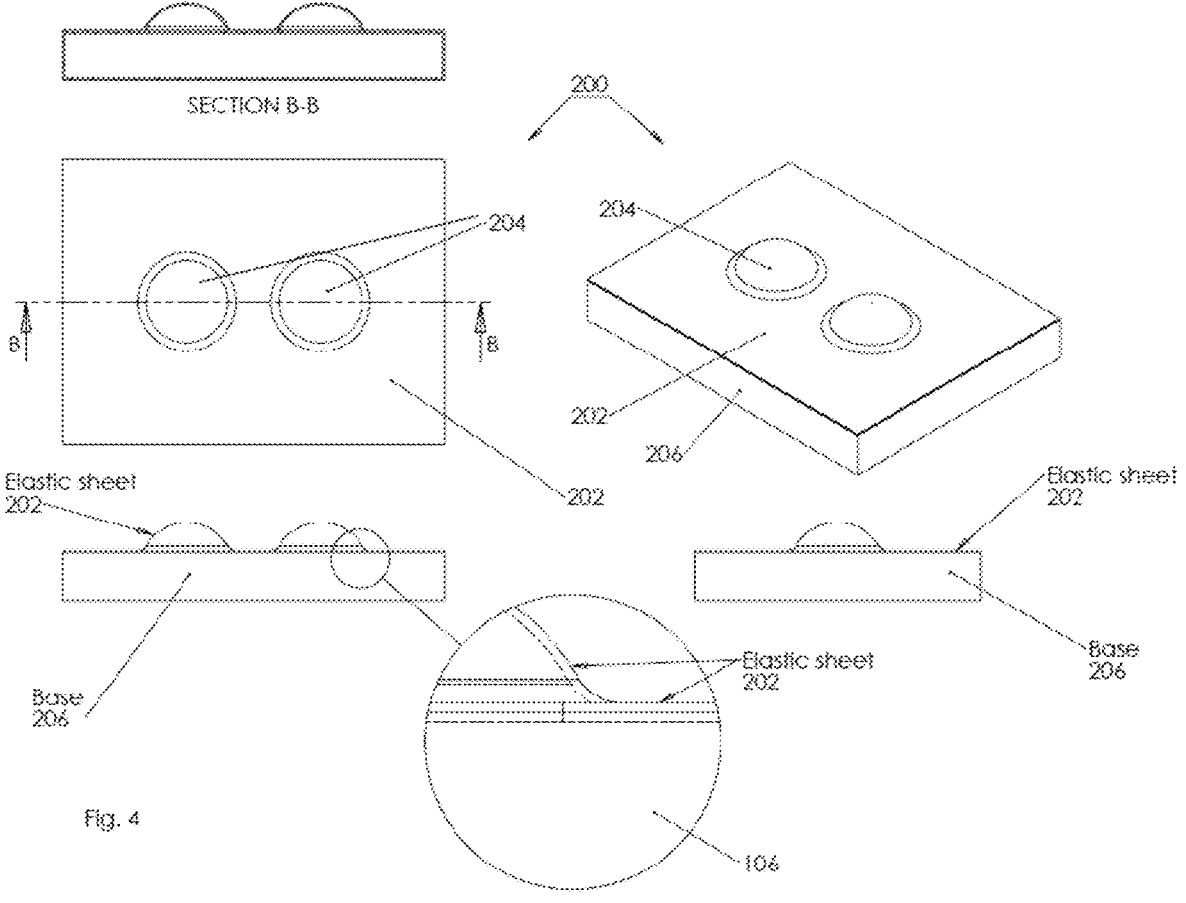
FIG. 4 is a schematic illustration of a shape-changing printing bed comprising inflatable body, from different views, according to embodiments of the present disclosure.

Reference is now made to FIG. 4, which is a schematic illustration of a shape-changing printing bed comprising inflatable body, from different views, e.g., front, top, isometric, and side views, according to embodiments of the present disclosure. In some embodiments, instead of actuators 104, elastic sheet 202 may cover one or more inflatable or partly inflatable articles 204, which may change from inflated to deflated state and vice versa, as well as adjust the amount of deflation or inflation of such, to thereby adjust the shape of elastic sheet 202. The one or more inflatable or partly inflatable articles 204 may be inflated or deflated independently of one another. In some embodiments, elastic sheet 202 may be attached to the inflatable of partly inflatable article 204 via adhesive, though in other embodiments, the elastic sheet may be the upper surface of the inflatable or partly inflatable article 204 itself. In some embodiments, the inflatable or partly inflatable article 204 may be connected to a base 206, which may be connected to a gas supply, e.g., compressed air, to enable such inflation and deflation of the one or more inflatable or partly inflatable articles 204.

In some embodiments, the elastic sheet 202 may be an inflatable or partly inflatable article, to allow a quick change of shape of the printing bed 200 and thus enable manufacturing of similar products, e.g., of different sizes in a non-time-consuming manner. One example of manufacturing products of different sizes with little time waste between production of each size, may include creating different sized T-shirts. According to some embodiments, when the printing bed comprises an inflatable or partly inflatable elastic sheet 202, this may allow easy release of three-dimensional (3D) products such as seat covers (upholstery) where the printed product has a 3D shape. In such case, by changing the zones of inflation and deflation of the elastic sheet 202, the 3D printed product or item may be removed or pushed away from the adjustable and shape-changing printing bed 200, more easily.

Using a shape adjustable printing bed, and particularly inflatable or semi-inflatable printing bed 200 may assist in releasing the printed products from the printing bed, as the printing bed itself or specific zones of the printing bed may be moved away from the printed product in a controlled manner.

Figure 5A:
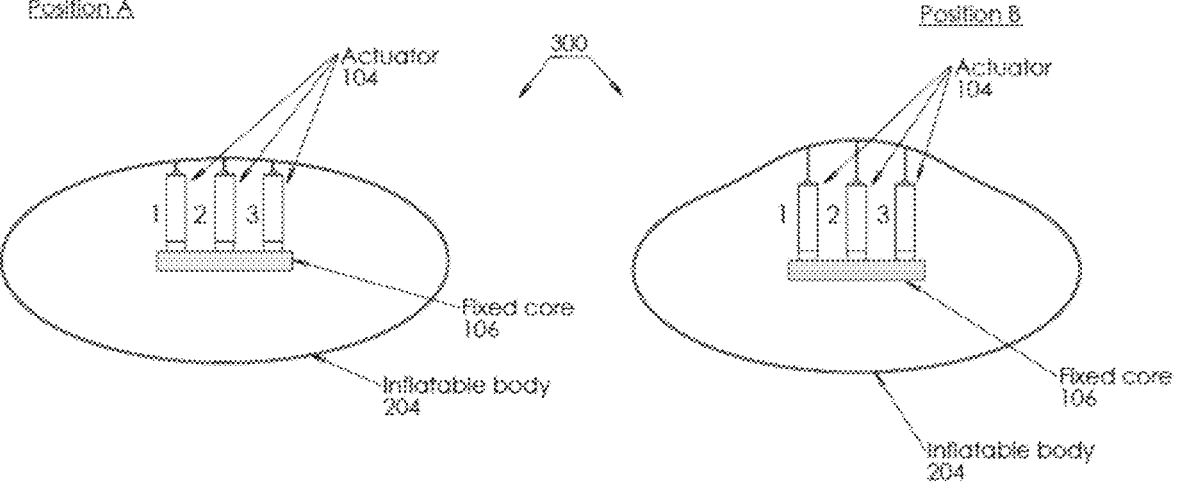
FIG. 5A is a schematic illustration of a cross-section view of a shape-changing printing bed comprising actuators and inflatable bodies, in different positions, according to embodiments of the present disclosure.

Reference is made to FIG. 5A, which is a schematic illustration of a cross-section view of a shape-changing printing bed comprising actuators and inflatable articles, in different positions, according to embodiments of the present disclosure. According to some embodiments, shape-changing printing bed 300 may comprise a combination of neighboring actuators 104 and inflatable or partly inflatable articles 204, which are positioned in close proximity under the same inflatable elastic sheet. In some embodiments, the inflatable or partly inflatable articles 204 may apply a first force against a corresponding zone of the inner side of the inflatable elastic sheet, while the actuators 104 may independently apply a second force against the same zone of the inflatable elastic sheet. Thus, the additional second force applied by actuators 104 may be used to change the shape of smaller more specified areas in that same zone of the inner side of the inflatable elastic sheet. That is, the inflation, which is applied by compressed air, applies uniform force along the entire inner side of the inflatable elastic sheet, while the actuators 104, which are positioned underneath the inflatable elastic sheet, applies additional pulling or pushing force on the inflatable elastic sheet. The additional pulling and/or pushing force is configured to fine-tune and further adjust the shape of the printing bed at the position of the inflatable elastic sheet where the actuators are positioned.

As illustrated in Position A, inflatable or partly inflatable articles 204 may expand its dimensions and thus expand dimensions of the elastic sheet covering the inflatable or partly inflatable articles 204, by applying a first force against the inner side 102″ of the elastic sheet 102. In this case, force is applied against the inner side of the elastic sheet 102 by air that is inserted into inflatable or partly inflatable articles 204 and pushed against the inner side of the elastic sheet.

As illustrated in Position B, after a first force is applied against the inner side of the elastic sheet by inflatable or partly inflatable articles 204, actuators 104 may be operated to apply a second force against approximately the same zone of the inner side of elastic sheet 102, as the zone that expands due to application of the first force by the inflatable or partly inflatable articles 204. The second force applied by actuators 104 may be a pushing force against the inner side of the elastic sheet, by lengthening the retractable actuator arm 124, thereby pushing the elastic sheet further away from the actuator body 114, to thereby create a convex shape on the external surface of the elastic sheet.

Such pushing force is illustrated in Position B by actuators 104 numbered as 1, 2 and 3. As illustrated in Position B, actuator no. 2 is an actuator that its retractable actuator arm 124 is extracted through and out of its corresponding actuator body the most, such to be farther away from the fixed core 106, compared to actuators nos. 1 and 3, which also have their respective retractable actuator arm 124 extracted and lengthened away from fixed core 106, though not as much as actuator no. 2.

Another force that may be applied by actuators 104 may be a pulling force, when the retractable actuator arm 124 is pulled into its respective actuator body 114, such that the elastic sheet that is connected to the retractable actuator arm 124 is pulled towards the actuator body 114, to thereby create a concave shape on the external surface of the elastic sheet.

The additional second force applied by actuators 104 may be used to change the shape of smaller more specified areas in that same zone of the inner side of the elastic sheet, compared to the less specific or less accurate change in shape performed by the inflatable or partly inflatable articles 204, as can be seen when comparing Position B to Position A.

In some embodiments, the combination of actuators 104 and inflatable or partly inflatable articles 204 may be employed so that the actuators 104 may bring the dimensions of the inflatable or partly inflatable articles 204 to precise dimensions and shape, at those zones along the elastic sheet 102 where accurate dimensions are crucial. Whereas the inflatable or partly inflatable articles 204 may play a secondary, complementary role, in defining the final shape of the inflatable printing bed 300, e.g., by smoothing the space between two adjacent actuators, mainly in areas where precise size is less important.

The forces applied onto the elastic sheet by the actuators and/or inflatable or partly inflatable articles 204 in one position dictate specific printing bed dimensions and shape, which differs from those dimensions and shape of another position. It should be clear that positions A and B merely illustrate examples of an adjustment and shape change of the printing bed 300 of the present disclosure. Other changes in shape, via any combination of actuators and inflatable or partly inflatable articles 204, which may or may not be integral with the elastic sheet, may be implemented per request and according to the product or item that is to be printed onto the adjustable shape-changing printing bed of the present disclosure.

Figure 5B:
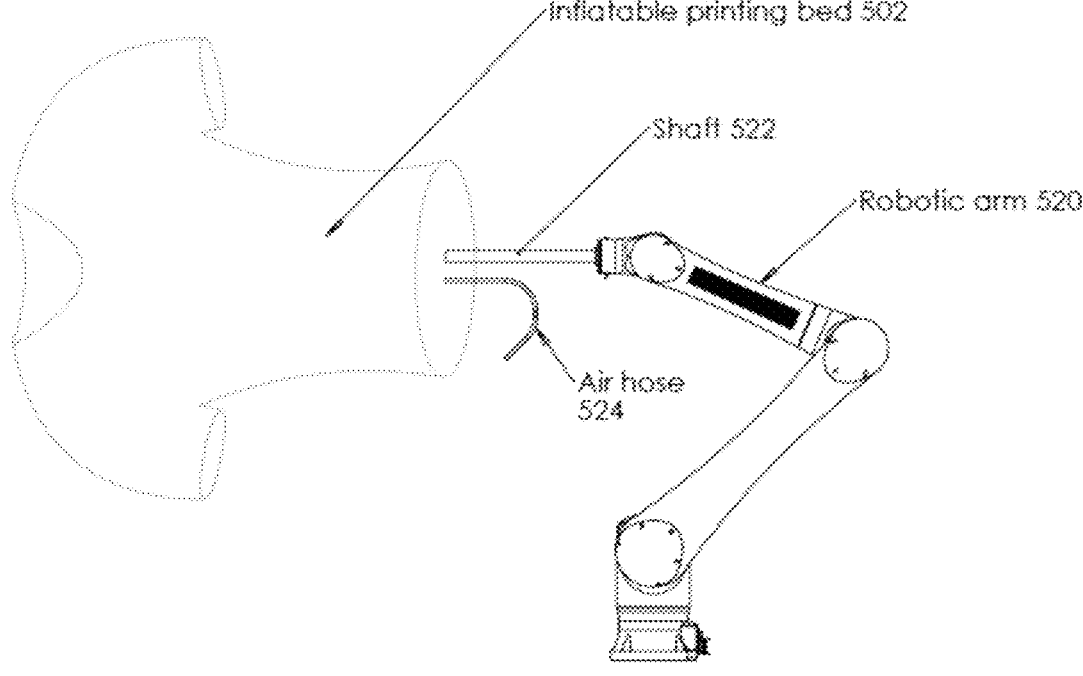
FIG. 5B is a schematic illustration of a shape-changing printing bed of a specific shape, as an example, according to an embodiment of the present disclosure.

Reference is now made to FIG. 5B, which is a schematic illustration of a shape-changing printing bed of a specific shape, as an example, according to an embodiment of the present disclosure. FIG. 5B schematically illustrates a printing bed comprising inflatable or partly inflatable article(s), which may be covered by or may be an integral part of the elastic sheet. The elastic sheet may be inflatable and size and shape adjustable such to conform itself to AM printing of various products that require at least one zone of circular or cylinder-like shape, for example, T-shirts.

In such case, the inflatable elastic sheet 502 provides the base for printing the full-length section of the T-shirt, from the neck or full shoulder to the other end of the T-shirt. In some embodiments, a robotic arm 520 may hold the inflatable elastic sheet via a shaft 522, and an air hose 524 may be inserted into the inflatable elastic sheet 502 and may be controlled as to the degree of inflation, e.g., amount of air flow provided by the air hose 524, the duration of inflation, and so on.

Figure 6:
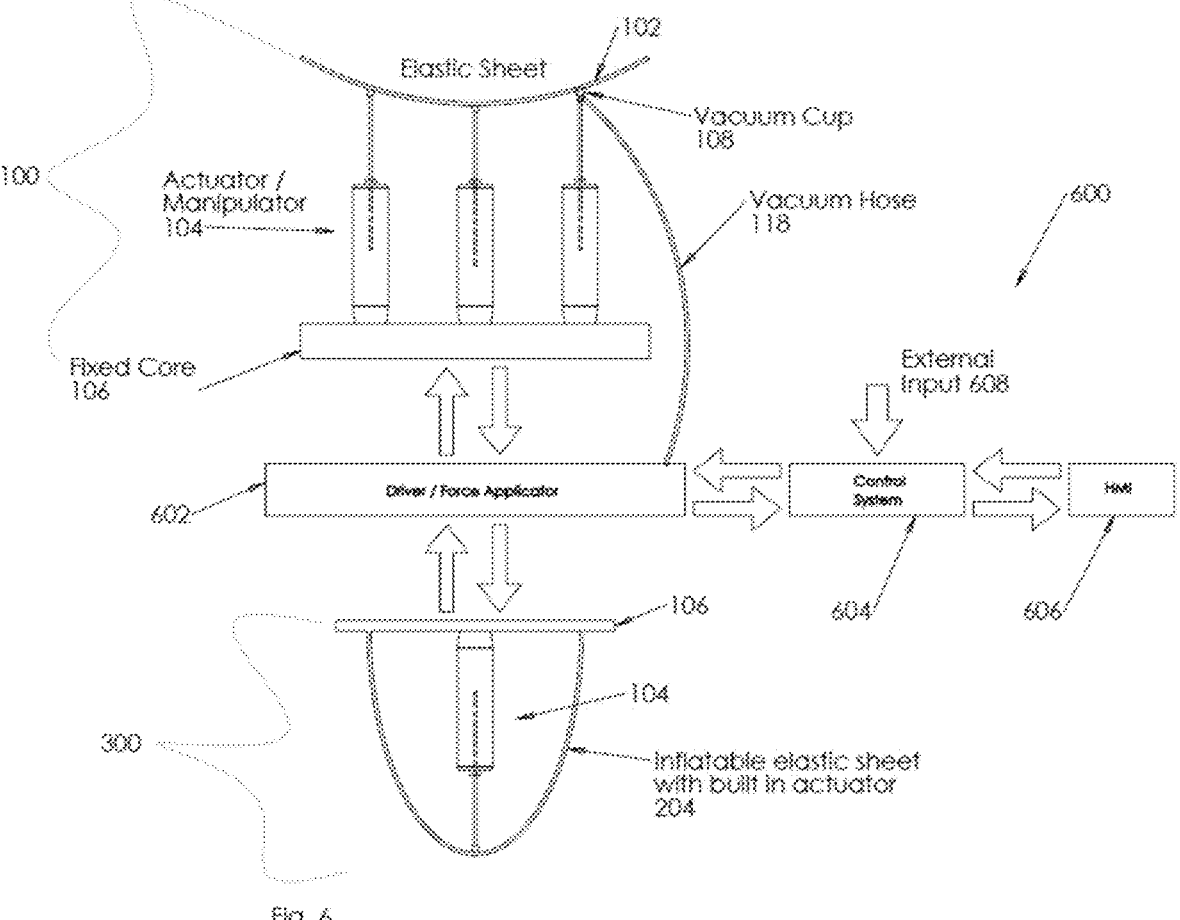
FIG. 6 is a schematic illustration of a shape-changing printing bed system, according to embodiments of the present disclosure.

Reference is now made to FIG. 6, which is a schematic illustration of a shape-changing printing bed system, according to embodiments of the present disclosure.

According to some embodiments, a shape-changing printing bed system 600 is provided. Shape-changing printing bed system 600 may comprise an adjustable shape-changing printing bed according to one or more embodiments of the present disclosure, and a control system 604. Control system 604 may be configured to control operation of the shape-changing printing bed, e.g., shape-changing printing bed 100 and/or 300. Control system 604 may facilitate manufacturing of a variety of products within a variety of industries. Some examples for products in which the adjustable shape-changing printing bed of the present disclosure may be used, are bras and bra cups, T-shirts and other clothing items, domestic and vehicle seats, vehicle interior panels, and large building construction parts such as curved concrete bridges and buildings roofs.

In some embodiments, control system 604 of the adjustable shape-changing printing bed, may control, operate and adjust lengths of each one of the actuators 104. Control system 604 may control and dictate the degree at which each actuator 104 pushes the elastic sheet 102 upwards and away from fixed core 106, e.g., to create a protrusion, or pulls the elastic sheet 102 inwards towards fixed core 106, e.g., to create an indent, so that the desired shape of the elastic sheet 102 can be changed instantly, within a very short time, e.g., within seconds. The control system 604 may be operated in real-time by user command, e.g., via local HMI (Human input) software and hardware 606 and/or may be operated automatically following an external input 608, which may be a production plan that is provided to the control system 604 at the beginning of production, e.g., via computerized production files.

According to some embodiments, the control system 604 may receive data from a variety of sources, for example: a pre-defined design, or scanned items, e.g., items scanned in real-time, or by user command.

The control system 604 may activate the actuators 104 and/or the inflatable or partly inflatable articles 204, and adjust their length and/or control inflation/deflation degree, respectively, according to the received data, whether by HMI 606 or external input 608. By controlling and adjusting change in length of actuators 104 and/or change in inflation degree in inflatable or partly inflatable articles 204, the elastic sheet 102 is forced to adopt a new shape, along one or more of the X, Y, and Z axes, such that shape of the elastic sheet 102 conforms to the shape of the pre-defined design, or of the scanned items or to follow user command.

In some embodiments, there may be a driver or force applicator 602, which may be configured to receive control instructions from control system 604 and to execute these instructions by operating the shape-changing printing bed of the present disclosure, e.g., printing beds 100 or 300. Driver/force applicator 602 may be further configured to provide current status of position of the actuators 104 and of the inflatable or partly inflatable articles 204 to control system 604, such that control system 604 may determine whether additional or different changes and adjustments are required in order to bring actuators 104 and inflatable or partly inflatable articles 204 to their final position, to thereby provide the final shape and size of elastic sheet 102. In some embodiments, status of position of the actuators 104 and of the inflatable or partly inflatable articles 204 may be provided to control system 604 by driver/force applicator 602 every predetermined period, whereas in other embodiments, status information may be provided to the control system 604 upon initiation of a control request by control system 604 sent to driver/force applicator 602.

The elastic sheet, e.g., elastic sheet 102 or 202, of the adjustable shape-changing printing bed 100, 200 or 300, respectively, may be adjusted to form substantially any size and shape, thereby allowing greater flexibility for additive manufacturing of complex shaped panels and sheets, and further avoiding the use of fillers such as gel fillers, reducing setup time, reducing printing time, improving productivity, and reducing 3D printing costs.

There is further provided a method for changing shape of a shape-changing printing bed system, said method comprising:

(i) providing a shape-changing printing bed system, comprising:

a shape-changing printing bed comprising:

an elastic sheet comprising an inner side and an external side; and a manipulator unit;

wherein the elastic sheet has a given size and shape, and the external side of the elastic sheet is configured to cover the manipulator unit;

and a control system;

and (ii) controlling change in direction and extent of force applied by the manipulator unit against the inner side of the elastic sheet in at least one coordinate by the control system, thereby changing shape of the shape-changing printing bed.

In some embodiments, the manipulator unit may comprise: a fixed core; and multiple actuators having two opposing fixation ends, each of the multiple actuators being connected to the fixed core via a first fixation end, and each of the multiple actuators being connected to the inner side of the elastic sheet via a second fixation end.

In some embodiments, the controlling comprises controlling movement of the multiple actuators at their second fixation ends along one or more of X, Y and Z axes, which causes pushing or pulling force to be applied against the inner side of the elastic sheet, thereby moving the inner side of the elastic sheet along one or more of the X, Y, and Z axes, which results in changing shape of the elastic sheet.

In some embodiments, the manipulator unit may comprise actuators, as those described hereinabove, e.g., in FIG. 1, or inflatable or partly inflatable articles or a combination of neighboring actuators and inflatable or partly inflatable articles. When the manipulator comprises a combination of both, the controlling comprises controlling application of a first force by the inflatable or partly inflatable articles on a corresponding zone of the inner side of the elastic sheet, while controlling application of a second force by the actuators against the same zone, independently of the application of the first force, thereby changing shape of smaller more specified areas in the zone of the inner side of the elastic sheet by the application of the second force.

In some embodiments, the controlling may comprise controlling length of each actuator and further controlling inflation or deflation of the inflatable or partly inflatable articles such to change the shape of the elastic sheet within a short time from the time a control command is provided by the control system.

In some embodiments, the controlling is performed in real-time by user command and/or is performed automatically according to a predetermined production plan provided to the control system via a computerized production file.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A shape-changing printing bed system for use during additive manufacturing, the system comprising:

a shape-changing printing bed comprising:

an elastic sheet comprising an inner side and an external side; and a manipulator unit;

wherein the elastic sheet has a given size and shape, and the external side of the elastic sheet is configured to cover the manipulator unit;

and a control system;

wherein the control system is configured to control change in the size and/or shape of the elastic sheet by controlling change in direction and extent of force applied by the manipulator unit against the inner side of the elastic sheet in at least one coordinate, wherein the manipulator unit comprises at least one inflatable or partly inflatable article having a back surface and a front surface, wherein the front surface is facing the inner side of the elastic sheet, and wherein inflation or deflation of the at least one inflatable or partly inflatable article causes the front surface to change position in one or more of X, Y,Z axes, thereby applying force against the inner side of the elastic sheet in one or more of X, Y and Z axes, wherein the inflatable or partly inflatable article comprises at least two separate zones allowing inflation or deflation of each zone independently from one another.

2. The shape-changing printing bed system of claim 1, wherein the control system is configured to control the manipulator unit to apply force against the inner side of the elastic sheet, in a pre-determined controlled manner, based on external input.

3. The shape-changing printing bed system of claim 1, wherein the manipulator unit comprises:

a. a fixed core; and b. multiple actuators having two opposing fixation ends, each of the multiple actuators being connected to the fixed core via a first fixation end, and each of the multiple actuators being connected to the inner side of the elastic sheet via a second fixation end.

4. The shape-changing printing bed system of claim 3, wherein movement of the multiple actuators at their second fixation ends along one or more of X, Y and Z axes causes pushing and/or pulling force to be applied against the inner side of the elastic sheet, thereby causing the inner side of the elastic sheet to be moved along one or more of the X, Y, and Z axes, which changes shape of the elastic sheet.

5. The shape-changing printing bed system of claim 1, wherein the elastic sheet is connected to or is the front surface of the inflatable or partly inflatable article.

6. The shape-changing printing bed system of claim 3, wherein the manipulator unit comprises a combination of neighboring actuators and inflatable or partly inflatable articles, wherein the inflatable or partly inflatable articles apply a first force on a corresponding zone of the inner side of the elastic sheet, while the actuators independently apply a second force against the same zone, to change shape of smaller more specified areas in said zone of the inner side of the elastic sheet.

7. The shape-changing printing bed system of claim 6, wherein the control system is configured to control length of each actuator and further control inflation or deflation of the inflatable or partly inflatable articles such to change the shape of the elastic sheet within a short time from the time a control command is provided by the control system.

8. The shape-changing printing bed system of claim 7, wherein the control system is operated in real-time by user command and/or is operated automatically according to a predetermined production plan provided to the control system via a computerized production file.

9. The shape-changing printing bed system of claim 3, wherein each actuator comprises an actuator body and a retractable actuator arm passing therethrough, wherein the control system is configured to control length of each retractable actuator arm with respect to the actuator body, wherein extending the length of the retractable actuator arm outside the actuator body pushes the inner side of the elastic sheet outwards to create a protrusion along the external side of the elastic sheet, and shortening the length of the retractable actuator arm pulls the inner side of the elastic sheet inwards to create an indent, thereby changing shape of the elastic sheet within a short time from a control command provided by the control system.

10. The shape-changing printing bed system of claim 9, wherein the control system is operated in real-time by user command and/or is operated automatically according to a predetermined production plan provided to the control system via a computerized production file.

11. The shape-changing printing bed system of claim 1, wherein the control system is configured to control inflation or deflation of the inflatable or partly inflatable articles such to change the shape of the elastic sheet within a short time from a control command provided by the control system.

12. The shape-changing printing bed system of claim 11, wherein the control system is operated in real-time by user command and/or is operated automatically according to a predetermined production plan provided to the control system via a computerized production file.

13. A method for changing shape of a shape-changing printing bed system, said method comprising:

providing a shape-changing printing bed system, comprising:

a shape-changing printing bed comprising:

an elastic sheet comprising an inner side and an external side; and a manipulator unit;

wherein the elastic sheet has a given size and shape, and the external side of the elastic sheet is configured to cover the manipulator unit;

and a control system;

and controlling change in direction and extent of force applied by the manipulator unit against the inner side of the elastic sheet in at least one coordinate by the control system, thereby changing shape of the shape-changing printing bed, wherein the manipulator unit comprises:

a fixed core; and multiple actuators having two opposing fixation ends, each of the multiple actuators being connected to the fixed core via a first fixation end, and each of the multiple actuators being connected to the inner side of the elastic sheet via a second fixation end, wherein controlling comprises controlling movement of the multiple actuators at their second fixation ends along one or more of X, Y and Z axes, which causes pushing or pulling force to be applied against the inner side of the elastic sheet, thereby moving the inner side of the elastic sheet along one or more of the X, Y, and Z axes, which results in changing shape of the elastic sheet, and wherein the manipulator unit comprises a combination of neighboring actuators and inflatable or partly inflatable articles, wherein controlling comprises controlling application of a first force by the inflatable or partly inflatable articles on a corresponding zone of the inner side of the elastic sheet, while controlling application of a second force by the actuators against the same zone, independently of the application of the first force, thereby changing shape of smaller more specified areas in said zone of the inner side of the elastic sheet by said application of said second force.

14. The method of claim 13, wherein the controlling comprises controlling length of each actuator and further controlling inflation or deflation of the inflatable or partly inflatable articles such to change the shape of the elastic sheet within a short time from the time a control command is provided by the control system.

15. The method of claim 14, wherein the controlling is performed in real-time by user command and/or is performed automatically according to a predetermined production plan provided to the control system via a computerized production file.

16. The method of claim 13, wherein each actuator comprises an actuator body and a retractable actuator arm passing therethrough, wherein the controlling comprises controlling length of each retractable actuator arm with respect to the actuator body, wherein extending the length of the retractable actuator arm outside the actuator body pushes the inner side of the elastic sheet outwards to create a protrusion along the external side of the elastic sheet, and shortening the length of the retractable actuator arm pulls the inner side of the elastic sheet inwards to create an indent, thereby changing shape of the elastic sheet within a short time from a control command provided by the control system.

\* \* \* \* \*